Figure 1:
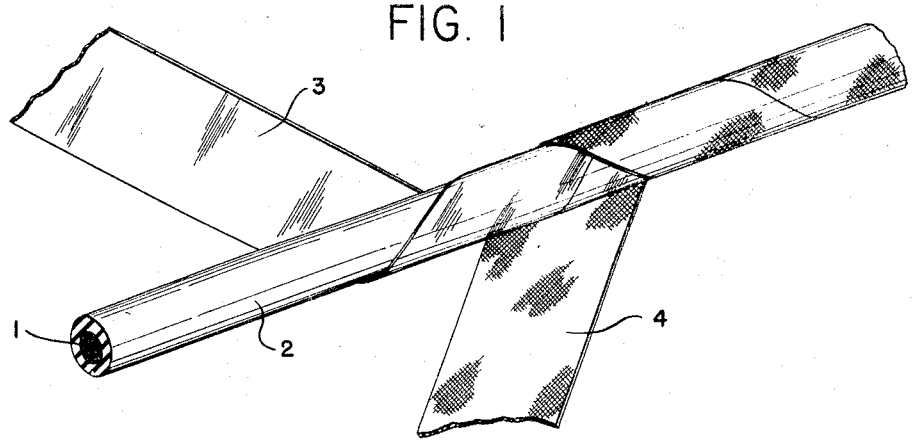

May 10, 1960  W. H. BENTON, JR  2,936,258
FABRICATION OF INSULATED ELECTRICAL CONDUCTORS
Filed Dec. 31, 1956

INVENTOR
William H. Benton, Jr.
BY
ATTORNEYS 2,936,258
FABRICATION OF INSULATED ELECTRICAL CONDUCTORS

William H. Benton, Jr., Marion, Ind., assignor to Anaconda Wire and Cable Company, a corporation of Delaware Application December 31, 1956, Serial No. 631,671

6 Claims. (Cl. 154—2.28)

This invention relates to the fabrication of rubber covered electrical conductors. More particularly, the invention relates to an improved method of making conductors covered with a continuous layer of cured rubber composition by applying uncured rubber composition to the conductor, confining the uncured rubber in a metal foil wrapping, and then curing the rubber composition while it is thus confined.

Rubber insulated conductors have long been manufactured by a method which involves forming a layer of uncured rubber composition about a wire, then extruding a lead jacket about the uncured rubber, and curing viz., vulcanizing the rubber composition within such lead enclosure. In carrying out this method the length of conductor after being covered with the uncured rubber composition is coiled in a pan and must be well covered with an agent such as powdered soapstone to prevent the coils from inadvertently adhering to one another. Great care must be taken in handling the covered conductor prior to applying the lead jacket to prevent deformation of the easily deformed uncured rubber composition. For these reasons the use of an extruded lead jacket to confine the rubber covering while it is being cured makes for an operation that is rather costly and is always attended by a substantial risk of high scrap losses. Further, since the rubber is in effect molded in an extruded lead mold, its surface quality can be no better than that of the inner surface of the extruded metal.

The present invention provides a greatly improved and simplified method of fabricating insulated electrical conductors which retains the suitability of the lead jacket method to the manufacture of relatively short lengths of conductors, but which makes it possible to eliminate coating the uncured rubber with soapstone or the like and to minimize the need for extreme care in handling prior to curing. The new method eliminates the use of lead as the means of confining the rubber composition during curing and substitutes a confining means which is both lower in first cost and more economical to apply and remove, thus greatly reducing the cost of making the product. Moreover, the surface finish imparted to the finished article is superior to that attained by the lead jacket method. In carrying out the new method, a continuous layer of uncured rubber composition is extruded or otherwise formed about at least one metallic conductor. The uncured rubber composition is then enveloped in a wrapping of thin metallic foil, and a binder tape is helically wrapped under tension about the metallic foil, said binder tape substantially completely enclosing the foil and holding it closely against the layer of rubber composition. The rubber composition then is cured by the application of heat while it is confined within the foil wrapping. Thereafter the foil and tape are generally removed from the resulting cured rubber covered conductor.

Unlike the heavy and bulky press required for a lead extrusion unit, the necessary foil and tape wrapping machines may be readily located adjacent the rubber extrusion unit in position to apply such wrapping directly upon emergence of the covered conductor. Hence the necessity for careful coiling and handling of the article with its covering of uncured rubber may be avoided. Furthermore, since the newly formedf uncured layer may be enclosed in the foil mold without delay, there is not necessity for coating it with soapstone to prevent adhesion. Metallic foil has an inherently smooth finish, much smoother than a lead extrusion, which results in an improved surface quality on the finished rubber insulation.

Figure 2:
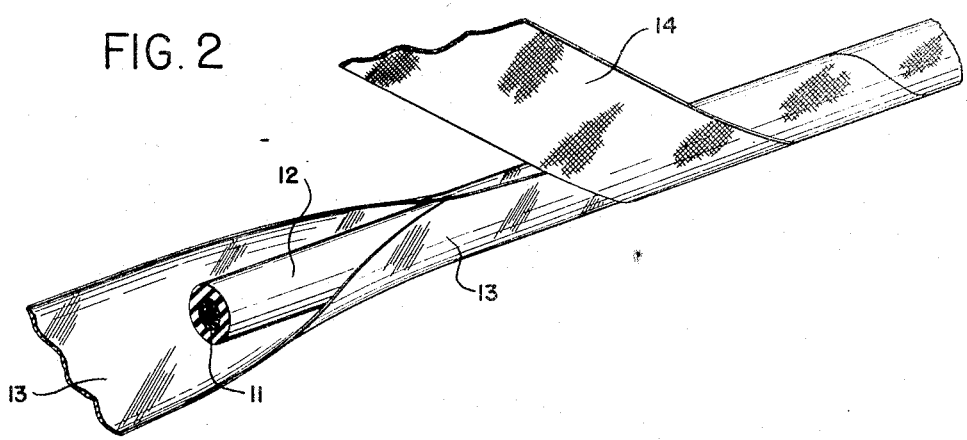

Preferred embodiments of the method of this invention are described in more detail in the following description, which refers to the accompanying drawings; wherein Fig. 1 shows a freshly covered conductor being enclosed in metallic foil wrapped helically about it; and Fig. 2 shows a similar conductor being enclosed in metallic foil wrapped longitudinally about it.

Referring to Fig. 1, a metallic electrical conductor 1 is first covered with a continuous layer of uncured rubber composition 2, advantageously by extruding the composition about the conductor. Upon leaving the rubber extrusion unit the covered wire is directed to a wrapping machine where a continuous strip of thin foil 3 of aluminum or the like is helically wrapped about the uncured rubber composition. The edges of the turns of foil may be laid on in substantially abutting relation, or the edges may be overlapped, as desired; but in any event since the function of the foil is to substantially completely enclose the rubber composition, the edges should be free from any substantial separation. If desired and if applied with an overlap, the edges of the foil may be chemically bonded (by means of an adhesive composition) or electrically bonded (by means of seam welding) to each other. Any thin metallic foil, preferably aluminum foil, or foil-backed fabric, foil-backed plastic, metallized cloth or metallized paper may well be used as the material which composes the foil tape. The foil surface wrapped in contact with the rubber composition should of course be smooth, preferably of the smoothness which characterizes cold rolled metal; and the tape should, especially if the edges are overlapped, be very thin (no more than 0.001 or 0.002 inch).

The foil-wrapped article then receives a wrapping of fabric binder tape 4 which is helically applied under considerable tension about the aluminum foil 3. The direction of lay of the binder tape may be the same as that of the underlying foil tape, but its edges should in such case be offset substantially from the edges of the foil tape. Alternatively, and as shown in Fig. 1, the binder tape may be laid on in the direction opposite to that of the foil wrapping 3, so that the direction of lay of the tape seams is offset with respect to the direction of lay of the foil seams. In either case, if slight separations do occur between the turns of the foil wrapping, the uncured rubber 2 will still be contained by the overlying binder tape 4.

With the aluminum foil 3 held tightly against the layer of uncured rubber composition 2 and reinforced against distension by the fabric binder tape 4, the article is subjected to an elevated temperature high enough, and for a period of time long enough, to effect curing or vulcanizing of the rubber composition 2 within the foil mold. Textile fabrics which retain adequate strength to reinforce the soft foil wrapping at the curing temperature of most rubber compositions are readily available, but for compositions that possess an exceptionally high curing temperature, metal fabric, or high softening point glass fabric may be used for the binder tape. In the appended claims the word "fabric" is intended to embrace all of these or the equivalent. The surface imparted to the rubber covering as a result of being cured within the metal foil wrapping is exceptionally smooth because of the continuous smoothness of the foil itself, and if any ridges are formed in the rubber composition at the helical seams of the foil they will be of very minute proportions—no higher than the thickness of the foil in any case.

After the curing operation, the fabric binding tape and the aluminum foil may easily be stripped from the rubber composition, thus freeing the finished insulated electrical conductor. Either or both tapes may be removed either by unwinding, or by cutting them through along the length of the conductor and peeling the cuttings away. In either case removal of the tapes is considerably easier and more quickly accomplished than the removal of a relatively heavy extruded lead jacket. In some cases, it may be desirable to retain the protection provided by the foil alone, or by the foil plus fabric, and in such cases the conductor may be put to use without removing the foil, or without removing either foil or fabric. Thus, very thin aluminum tape has at least three valuable advantages in the method of the present invention: (1) It assumes a very smooth surface; (2) it forms ridges, if any, of inconsequential height; and (3) it is cheap and so can economically be discarded after use.

A second embodiment of the method of the invention is shown in Fig. 2. In this embodiment a conductor 11 which has been covered with a layer 12 of uncured rubber composition is enveloped by a thin metal foil 13 which is wrapped longitudinally rather than helically in place about the extruded layer of uncured rubber composition 12. In this embodiment also the edges of the foil may either overlap one another, as shown, or substantially abut so that there is substantially no separation between the foil edges. If overlapped, the edges may be chemically or electrically bonded together, if desired. A binder tape 14 is then helically wrapped about the foil under tension, as in the embodiment described above, and the uncured rubber composition is cured within the mold thus formed. The mold may then be either removed from the conductor or left in place. An advantage of this second embodiment of the invention is that any slight ridge formed on the surface of the rubber composition will extend in a straight line along the length of the conductor, resulting in a product that for some purposes will be deemed to have a more attractive appearance than when such ridges extend helically. Otherwise the two embodiments lead to the production of rubber covered conductors of essentially the same character and quality.

I claim:

1. A method of fabricating an insulated electrical conductor which comprises forming a continuous layer of uncured rubber composition about at least one metallic conductor, completely enveloping said layer of uncured rubber composition in a wrapping of metallic foil having a continuously smooth surface in contact with the rubber and being so thin as to have no substantial physical strength or rigidity, helically wrapping a fabric binder tape having greater strength than said foil under tension about said foil wrapping, said binder tape substantially completely enclosing said metallic foil and holding it closely against said layer of rubber composition, curing said rubber composition within said foil wrapping, and subsequently removing the binder tape and foil from the resulting rubber covered conductor.

2. A method of fabricating an insulated electrical conductor which comprises forming a continuous layer of uncured rubber composition about at least one metallic conductor, completely enveloping said layer of uncured rubber composition in a wrapping of metallic foil having a continuously smooth surface in contact with the rubber and being so thin as to have no substantial physical strength or rigidity applied with its edges overlapping, bonding together the overlapping edges of said foil wrapping, helically wrapping a fabric binder tape having greater strength than said foil under tension about said foil wrapping, said binder tape substantially completely enclosing said metallic foil wrapping and holding it closely against said layer of rubber composition, curing said rubber composition within said foil wrapping, and subsequently removing the binder tape and foil from the resulting rubber covered conductor.

3. A method of fabricating an insulated electrical conductor which comprises forming a continuous layer of uncured rubber composition about at least one metallic conductor, helically wrapping a strip of metallic foil having a continuously smooth surface in contact with the rubber and being so thin as to have no substantial physical strength or rigidity about said layer of uncured rubber composition with adjacent edges of said foil wrapping free from any substantial separation from each other, helically wrapping a fabric binder tape having greater strength than said foil under tension about said foil wrapping, said binder tape substantially completely enclosing said metallic foil and holding it closely against said layer of rubber composition, and heat-curing said uncured rubber composition within said foil wrapping.

4. A method of fabricating an insulated electrical conductor which comprises extruding a continuous layer of uncured rubber composition about at least one metallic conductor, helically wrapping a strip of soft aluminum foil about said layer of uncured rubber composition with its edges overlapping, said foil having a continuously smooth surface in contact with the rubber and being of thickness of the order of .001 to .002 inch, helically wrapping a fabric binder tape having greater strength than said foil under tension about said aluminum foil, said binder tape being laid on with its edges offset from the edges of said helical foil wrapping, heat-curing said uncured rubber composition while it is confined in said wrappings, and thereafter removing said tape and said metallic foil from the resulting rubber covered conductor.

5. A method of fabricating an insulated electrical conductor which comprises forming a continuous layer of uncured rubber composition about at least one metallic conductor, longitudinally wrapping a strip of metallic foil having a continuously smooth surface in contact with the rubber and being so thin as to have no substantial physical strength or rigidity about said layer of uncured rubber composition with the edges of said strip extending longitudinally of the conductor and being free from any substantial separation from each other, helically wrapping a fabric binder tape having greater strength than said foil under tension substantially completely about said metallic foil, and heat-curing said uncured rubber composition while it is confined within said wrappings.

6. A method of fabricating an insulated electrical conductor which comprises extruding a continuous layer of uncured rubber composition about at least one metallic conductor, longitudinally wrapping a strip of soft aluminum foil having a continuously smooth surface in contact with the rubber and being so thin as to have no substantial physical strength or rigidity, completely about said layer of uncured rubber composition with the edges of said strip extending longitudinally of the conductor and overlapping, helically wrapping a fabric binder tape having greater strength than said foil under tension about said aluminum foil, heat-curing said uncured rubber composition while it is confined in said wrappings, and thereafter removing said tape and said metallic foil from the resulting rubber covered conductor.

References Cited in the file of this patent

UNITED STATES PATENTS

| 308,890 | Grimshaw | Dec. 9, 1884 |
| 1,610,910 | Williams | Dec. 14, 1926 |
| 2,079,943 | Lobdell | May 11, 1937 |
| 2,090,744 | Boe | Aug. 24, 1937 |
| 2,225,298 | Cook | Dec. 17, 1940 |
| 2,298,748 | Brown | Oct. 13, 1942 |
| 2,353,426 | Engh | June 27, 1944 |
| 2,374,040 | Ryan | Apr. 17, 1945 |
| 2,550,453 | Coggeshall | Apr. 24, 1951 |
| 2,768,105 | Dittmore et al. | Oct. 23, 1956 |

FOREIGN PATENTS

| 599,617 | Great Britain | Mar. 17, 1948 |